United States Patent
Chae et al.

(10) Patent No.: US 11,594,746 B2
(45) Date of Patent: Feb. 28, 2023

(54) ANTIOXIDANT HAVING HIGH ANTIOXIDANT CAPABILITY FOR FUEL CELL, AND ELECTROLYTE MEMBRANE AND MEMBRANE-ELECTRODE ASSEMBLY COMPRISING SAME

(71) Applicants: Hyundai Motor Company, Seoul (KR); Kia Motors Corporation, Seoul (KR)

(72) Inventors: Il Seok Chae, Seoul (KR); Jae Jun Ko, Gyeonggi-do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 207 days.

(21) Appl. No.: 17/121,119

(22) Filed: Dec. 14, 2020

(65) Prior Publication Data

US 2021/0305611 A1    Sep. 30, 2021

(30) Foreign Application Priority Data

Mar. 26, 2020 (KR) .................. 10-2020-0036597

(51) Int. Cl.
  *H01M 8/1051* (2016.01)
  *H01M 8/1004* (2016.01)
  *H01M 4/86* (2006.01)
  *C09K 15/02* (2006.01)
  *C09K 15/12* (2006.01)

(52) U.S. Cl.
  CPC .......... *H01M 8/1051* (2013.01); *C09K 15/02* (2013.01); *C09K 15/12* (2013.01); *H01M 4/8652* (2013.01); *H01M 8/1004* (2013.01); *H01M 4/8663* (2013.01)

(58) Field of Classification Search
  None
  See application file for complete search history.

(56) References Cited

U.S. PATENT DOCUMENTS

| 8,367,267 | B2 | 2/2013 | Frey et al. |
| 9,379,388 | B2 | 6/2016 | Calabrese Barton et al. |
| 2020/0212469 | A1* | 7/2020 | Ko .................. H01M 8/1004 |

FOREIGN PATENT DOCUMENTS

| JP | 4011705 B2 * | 11/2007 |
| KR | 2019-0079139 A | 7/2019 |
| KR | 2019-0118867 A | 10/2019 |
| KR | 2019-0131689 A | 11/2019 |

(Continued)

OTHER PUBLICATIONS

D. E. Curtin et al., J. Power Sources, 131, 41-48 (2004).

(Continued)

*Primary Examiner* — Jonathan Crepeau
(74) *Attorney, Agent, or Firm* — Fox Rothschild LLP

(57) ABSTRACT

Disclosed are an antioxidant for a fuel cell having a high degree of dispersion and/or distribution and excellent antioxidant capability and a membrane-electrode assembly including the same. The antioxidant includes a metal oxide and a sulfur-containing organic compound, for example, an organic compound including a sulfinic acid anion group ($R$—$SO_2^-$), adsorbed on the metal oxide.

16 Claims, 4 Drawing Sheets

(56) References Cited

FOREIGN PATENT DOCUMENTS

KR 2020-0006387 A 1/2020

OTHER PUBLICATIONS

M. Aoki et al. et al., Electrochem. Commun. 8, 1509-1513 (2006).
P. Trogadas et al., Electrochem. Solid-State Lett.,11, B113-B116 (2008).
E. Endoh, ECS Trans., 16, 1229-1240 (2008).
Frank D. Coms et al., ECS Transactions, 16 (2) 1735-1747 (2008).
D. Zhao et al., J. Power Sources, 190, 301-306 (2009).
R. W. Cahn et al., Mater. Sci. & Technol., Ch. 10, Wiley-VCH Verlag, GmBH (2000).
A. P. Young et al., J. Electrochem. Soc., 157, B425-B436 (2010).
R. Uegaki et al., J. Power Sources, 196, 9856-9861 (2011).
P. Trogadas et al., J. Mater. Chem., 21, 19381-19388 (2011).
L. Gubler and W. H. Koppenol, J. Electrochem. Soc., 159, B211-B218 (2012).
N. Macauley et al., Electrochem. Lett., 2(4), F33-F35 (2013).
D. Banham et al., J. Electrochem. Soc., 161, F1075-F1080 (2014).
M. A. Hasan et al., Appl. Catal. A: General, 181, 171-179 (1999).
D. Zhao et al., J. Membr. Sci., 346, 143-151 (2010).
S. Makarov et al., Chem.: Eur. J., 20, 14164-14176 (2014).
Mohammad Wasil et al., Biochem. J. (1987) 243, 867-870.
E. Endoh, Handbook of Fuel Cells-Fundamentals, Technology and Applications, John Wiley & Sons, Ltd. (2010).
Ind. Eng. Chem. Res. 2002, 41, 3115-3123.

\* cited by examiner

ANTIOXIDANT HAVING HIGH ANTIOXIDANT CAPABILITY FOR FUEL CELL, AND ELECTROLYTE MEMBRANE AND MEMBRANE-ELECTRODE ASSEMBLY COMPRISING SAME

CROSS REFERENCE TO RELATED APPLICATION

The present application claims priority based on Korean Patent Application No. 10-2020-0036597, filed on Mar. 26, 2020, the entire content of which is incorporated herein for all purposes by this reference.

TECHNICAL FIELD

The present invention relates to an antioxidant for a fuel cell having a high degree of dispersion and/or distribution and excellent antioxidant capability, and an electrolyte membrane and a membrane-electrode assembly including the same.

BACKGROUND

A proton exchange membrane fuel cell (PEMFC or polymer electrolyte membrane fuel cell) is an electricity generation device using hydrogen fuel, which has high energy efficiency, simple system configuration and environmentally friendly advantages. A proton exchange membrane fuel cell is recently receiving attention as an energy conversion device for environmentally friendly vehicles.

The reaction for generating electricity in fuel cells occurs in a membrane-electrode assembly (MEA) composed of a perfluorinated-sulfonic-acid-(PFSA)-ionomer-based electrolyte membrane and an anode and a cathode. After hydrogen supplied to the anode, which is the oxidation electrode of the fuel cell, is separated into protons and electrons, the protons move to the cathode, which is the reduction electrode, via the membrane, and the electrons move to the cathode via the external circuit. At the cathode, oxygen molecules, protons and electrons react together to generate electricity and heat, and at the same time, water ($H_2O$) is generated as a reaction byproduct.

As the reaction gases of the fuel cell, hydrogen and oxygen cross over through the electrolyte membrane, thus promoting the production of hydrogen peroxide (HOOH). Hydrogen peroxide produces highly reactive oxygen-containing radicals such as hydroxyl radicals (.OH) and hydroperoxyl radicals (.OOH). These radicals attack the ionomer binder in the electrode and the perfluorinated-sulfonic-acid-based electrolyte membrane, causing chemical degradation of the membrane-electrode assembly, ultimately reducing the durability of the fuel cell.

As techniques for reducing chemical degradation, methods of adding various types of antioxidants have been proposed. The antioxidants are classified into primary antioxidants having a radical scavenger (or quencher) function and secondary antioxidants having a hydrogen peroxide decomposer function. These may be used alone or in combination.

Typical examples of the primary antioxidant may include cerium-based antioxidants, such as cerium oxide (or ceria) and cerium(III) nitrate hexahydrate, and manganese-based antioxidants, and typical examples of the secondary antioxidant may include manganese-based antioxidants such as manganese oxide, etc., and transition metal catalysts such as platinum (Pt), etc.

The cerium-oxide-based antioxidant that is used as the primary antioxidant is introduced in the form of nanoparticle or powder having a crystallite size of ones of nanometers or tens of nanometers. Since the cerium-oxide-based antioxidant is generally manufactured and then stored in the form of an agglomerate, it has to be dispersed before addition to the electrolyte membrane. Thus, in order to increase the degree of dispersion and/or distribution, an interfacial surfactant may be used to stabilize the surface of the antioxidant, but may decrease the active surface area of the antioxidant, which deteriorates the durability of the fuel cell. Therefore, it is necessary to develop antioxidants having distributional stability and antioxidant capability through a large active site.

SUMMARY

In preferred aspects, provided is an antioxidant having distributional stability and further increased antioxidant capability, and an electrolyte membrane and a membrane-electrode assembly including the same.

The objectives of the present invention are not limited to the foregoing, and will be able to be clearly understood through the following description and to be realized by the means described in the claims and combinations thereof.

In an aspect, provided is an antioxidant for a fuel cell, including a metal oxide and an organic compound including a sulfinic acid anion group ($R\text{—}SO_2^-$) and adsorbed on the metal oxide.

The metal oxide may be represented by Chemical Formula 1 below.

$$MO_{2-\delta} \qquad \text{[Chemical Formula 1]}$$

M may include one or more selected from the group consisting of a transition metal, and a rare-earth metal, and $\delta$ is an oxygen vacancy value that makes the metal oxide electrically neutral.

M may suitably include one or more selected from the group consisting of zirconium (Zr), cerium (Ce), samarium (Sm), gadolinium (Gd), and terbium (Tb).

The metal oxide may be supported on a support, and the support may include one or more selected from the group consisting of titanium dioxide ($TiO_2$), silicon dioxide (silica, $SiO_2$), cerium oxide, cerium zirconium oxide, gadolinium-doped cerium oxide, cerium oxide supported on titanium oxide, and cerium oxide supported on silicon dioxide.

The metal oxide may have a crystallite size of about 1 nm to 100 nm, about 5 nm to 80 nm, or about 10 nm to 50 nm.

The average particle diameter of the agglomerate of the metal oxide may be about 900 nm or less, about 500 nm or less, or about 100 nm or less.

The sulfur-element-containing organic compound may suitably include formamidine sulfinic acid.

The mass ratio of the metal oxide and the sulfur-element-containing organic compound may be about 10:0.1 to 10 or 10:0.5 to 4.

In another aspect, provided is a method of manufacturing an antioxidant for a fuel cell. The method may include preparing an admixture including a metal oxide and an organic compound including sulfur, e.g., a sulfinic acid anion group ($R\text{—}SO_2^-$), pulverizing the starting material, and heat-treating the pulverized material.

The starting material may be pulverized through dry milling.

The starting material may be pulverized at about 50 rpm to 1,000 rpm or at about 100 rpm to 500 rpm.

The pulverized material may be heat-treated at a temperature of about 40° C. to 250° C. or at a temperature of about 50° C. to 150° C.

The pulverized material may be heat-treated for about 20 min to 15 hr, or for about 2 hr to 6 hr.

In an aspect, provided is an electrolyte membrane including the antioxidant described herein. The electrolyte membrane may suitably include the antioxidant in an amount of about 0.05 wt % to 4 wt %, or about 0.2 wt % to 1 wt %, based on the total weight of the electrolyte membrane.

In another aspect, provided is a membrane-electrode assembly including an electrolyte membrane, a cathode disposed on one side of the electrolyte membrane, and an anode disposed on the remaining side of the electrolyte membrane, at least one of the electrolyte membrane, the cathode, or the anode including the antioxidant described herein.

According to various exemplary embodiments of the present invention, both the distributional stability and the antioxidant capability of an antioxidant can be increased.

According to various exemplary embodiments of the present invention, the chemical durability of an electrolyte membrane and a membrane-electrode assembly can be increased, and the endurance life of a fuel cell including the same can be prolonged.

The effects of the present invention are not limited to the foregoing, and should be understood to include all effects that can be reasonably anticipated from the following description.

Other aspects of the invention are disclosed infra.

DETAILED DESCRIPTION

Figure 1:
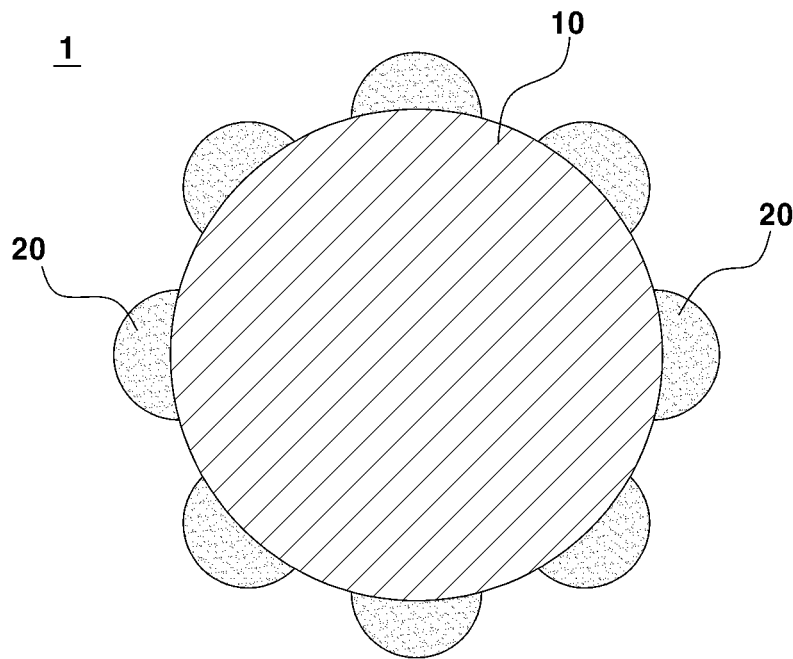
FIG. 1 shows an exemplary antioxidant according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In an aspect, provided is an antioxidant capable of increasing the chemical durability of a fuel cell or an electrode or electrolyte membrane included therein.

FIG. 1 shows an exemplary antioxidant for a fuel cell according to an exemplary embodiment of the present invention. With reference thereto, the antioxidant 1 includes a metal oxide 10 having antioxidant capability and a sulfur-element-containing organic compound 20 adsorbed on the metal oxide 10.

The metal oxide 10 may be represented by Chemical Formula 1 below.

$$MO_{2-\delta}$$ [Chemical Formula 1]

M may include one or more selected from the group consisting of a transition metal, and a rare-earth metal, and δ is an oxygen vacancy value that makes the metal oxide electrically neutral.

Preferably, M may suitably include one or more selected from the group consisting of zirconium (Zr), cerium (Ce), samarium (Sm), gadolinium (Gd), and terbium (Tb).

The metal oxide 10 may be supported on a support (not shown).

The support may include one or more selected from the group consisting of titanium dioxide ($TiO_2$), silicon dioxide (silica, $SiO_2$), cerium oxide, cerium zirconium oxide, gadolinium-doped cerium oxide, cerium oxide supported on titanium oxide, and cerium oxide supported on silicon dioxide. However, the present invention is not limited thereto, and any support may be used without limitation, so long as it has antioxidant capability and is capable of being used for fuel cells.

The metal oxide 10 may have a crystallite size of about 1 nm to 100 nm, about 5 nm to 80 nm, or preferably about 10 nm to 50 nm. When the crystallite size of the metal oxide 10 is less than about 1 nm, the solubility of the antioxidant may greatly increase and thus long-term stability may decrease. On the other hand, when the crystallite size thereof is greater than about 100 nm, the antioxidant capability may decrease. As used herein, the crystallite size may be measured through an X-ray diffraction (XRD) technique.

The agglomerate of the metal oxide 10 may have an average particle diameter of about 900 nm or less, about 500 nm or less, or preferably about 100 nm or less. When the average particle diameter of the agglomerate of the metal oxide 10 is greater than about 900 nm, the degree of dispersion and/or distribution thereof in the electrolyte membrane may greatly decrease. The lower limit of the average particle diameter of the agglomerate of the metal oxide 10 is not particularly limited, and may be, for example, 10 nm or 1 nm.

A method of manufacturing the antioxidant may include pulverizing the metal oxide 10 and the organic compound 20 including sulfur, e.g., e.g., a sulfinic acid anion group ($R—SO_2^-$). The average particle diameter of the metal oxide 10 after pulverization preferably falls in the above numerical range.

The sulfur-element-containing organic compound 20 may be adsorbed on the surface of the metal oxide 10 to thus improve the distributional stability of the metal oxide 10. Also, a compound having intrinsic antioxidant capability may be used, thereby further increasing the antioxidant capability of the antioxidant 1.

The organic compound 20 may suitably include formamidine sulfinic acid or thiourea dioxide as represented by Structural Formula 1 below.

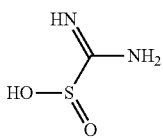

[Structural Formula 1]

The organic compound 20 is adsorbed on the surface of the metal oxide 10. Preferably, sulfinic acid ($R—SO_2H$) of the organic compound 20 represented by Structural Formula 1 may be oxidized to afford a compound having a sulfinic acid anion group ($R—SO_2^-$) represented by Structural Formula 2 below. The organic compound 20 is adsorbed on the metal oxide 10 via the sulfinic acid anion group.

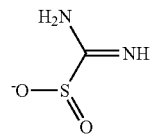

[Structural Formula 2]

As used herein, the organic compound containing sulfur, e.g., sulfinic acid ($R—SO_2H$), may be in an electrically neutral state, as represented in Structural Formula 1, or in an ionic state, as represented in Structural Formula 2. This depends on whether or not it is adsorbed on the metal oxide 10, and the non-adsorbed state means the former, and the adsorbed state means the latter. The meaning thereof will be able to be sufficiently understood based on the context before or after the corresponding part.

Figure 2:
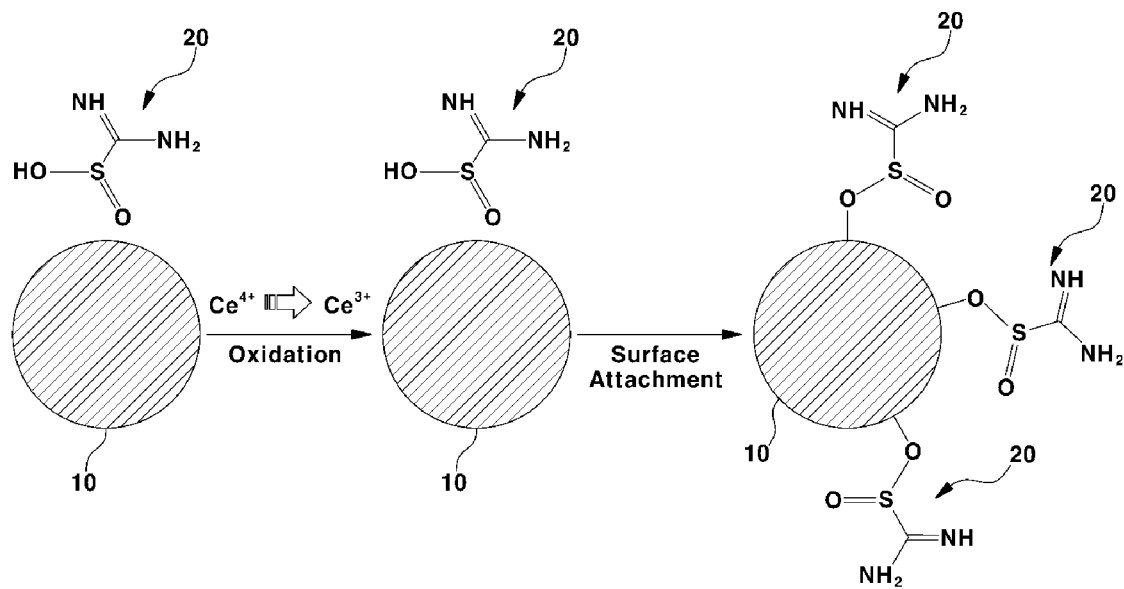
FIG. 2 is a reference diagram for explaining that a sulfur-element-containing organic compound is chemically adsorbed on the surface of metal oxide in the antioxidant according to the present invention.

FIG. 2 shows a diagram for explaining that the sulfur-containing organic compound 20 is chemically adsorbed on the surface of the metal oxide 10. In FIG. 2, the metal oxide 10 may be cerium oxide, for example, a tetravalent cerium cation ($Ce^{4+}$) located on the surface of the metal oxide 10 may be reduced into a trivalent cerium cation ($Ce^{3+}$), resulting in an oxygen vacancy.

Protective stabilization of the surface of the metal oxide 10 may be induced by adsorbing the sulfur-containing organic compound 20 on the surface of the metal oxide 10, thus ensuring the distributional stability of the antioxidant.

Also, the sulfur-containing organic compound 20 may include thiourea ($H_2NCSNH_2$) as a kind of functional group that is connected to the sulfinic acid anion group. Thiourea alone may have antioxidant capability to stabilize a hydroxyl radical. Thus, the sulfur-containing organic compound 20 may be adsorbed on the metal oxide 10, thereby further increasing the antioxidant capability of the antioxidant.

The mass ratio of the metal oxide 10 and the sulfur-containing organic compound 20 may be about 10:0.1 to 5, or preferably about 10:0.5 to 4. When the mass ratio of the above two components falls in the above numerical range, both antioxidant capability and distributional stability may be improved. When the mass ratio thereof is less than about 10:1, the amount of the sulfur-containing organic compound that is adsorbed on the surface of the metal oxide is too small, and thus the effect of increasing antioxidant capability may not be sufficient. On the other hand, when the mass ratio thereof is greater than about 10:4, the amount of the sulfur-containing organic compound that is adsorbed on the surface of the metal oxide is too large, and thus distributional stability may decrease due to excessive antioxidant agglomeration.

Figure 3:
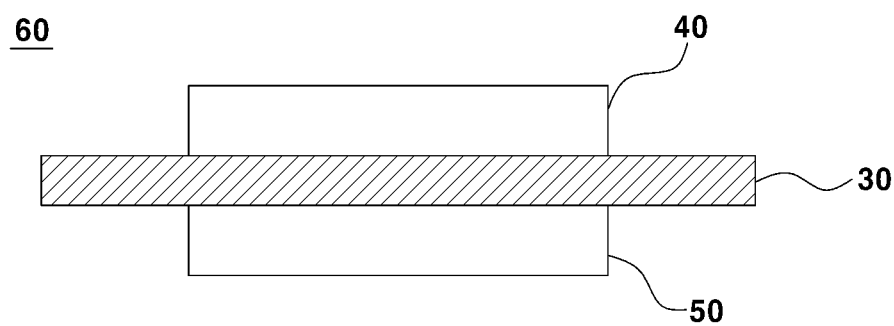
FIG. 3 shows an exemplary membrane-electrode assembly according to an exemplary embodiment of the present invention.

FIG. 3 shows an exemplary membrane-electrode assembly 60 according to an exemplary embodiment of the present invention. For example, the membrane-electrode assembly 60 may include an electrolyte membrane 30, a cathode 40 disposed on one side of the electrolyte membrane 30, and an anode 50 disposed on the remaining side of the electrolyte membrane 30.

The cathode 40 is configured to react with oxygen gas in the air, and the anode 50 is configured to react with hydrogen gas. Preferably, at the anode 50, hydrogen is decomposed into protons and electrons through a hydrogen oxidation reaction (HOR). The protons move to the cathode 40 via the electrolyte membrane 30 in contact with the anode 50. The electrons move to the cathode 40 via an external circuit (not shown).

The cathode 40 and the anode 50 may include a carbon-supported Pt catalyst, and may also include an ionomer binder for proton conduction in these electrodes.

The electrolyte membrane 30 may include an ionomer having proton conductivity. Any ionomer may be used, so long as it is able to transfer protons. An example thereof may include a perfluorinated sulfonic acid (PFSA) ionomer.

At least one of the electrolyte membrane 30, the cathode 40 or the anode 50 may include the antioxidant described above, and preferably, the electrolyte membrane 30 includes the antioxidant.

Figure 4:
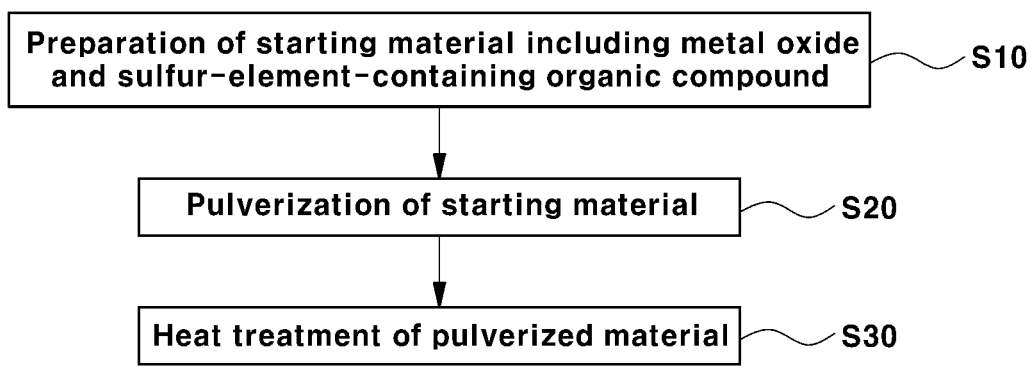
FIG. 4 shows an exemplary process of manufacturing an exemplary antioxidant for a fuel cell according to an exemplary embodiment of the present invention.

FIG. 4 shows an exemplary process of manufacturing an exemplary antioxidant for a fuel cell according to an exemplary embodiment of the present invention. The method may include preparing a starting material including a metal oxide and a sulfur-containing organic compound (S10), pulverizing the starting material (S20), and heat-treating the pulverized material (S30).

The metal oxide and the sulfur-containing organic compound are as described above, and a detailed description thereof is omitted.

The starting material may be pulverized through dry milling. For example, bead milling is performed at about 50 rpm to 1,000 rpm, or about 100 rpm to 500 rpm. When the rate of bead milling is less than about 50 rpm, the pulverization effect is very low, and thus the effect of uniformly adsorbing the sulfur-containing organic compound on the surface of the metal oxide is too low. On the other hand, when the bead milling rate is greater than about 1000 rpm, the effect of adsorbing the sulfur-containing organic compound on the surface of the metal oxide may decrease, attributed to excessive self-heating due to friction between antioxidant particles.

Thereafter, in order to more stably fix the sulfur-containing organic compound on the surface of the metal oxide, the metal oxide antioxidant having the sulfur-containing organic compound adsorbed thereon, obtained through pulverization, may be heat-treated at a temperature of about 40° C. to 250° C., or about 50° C. to 150° C. When the heat treatment temperature is less than about 40° C., the heat treatment effect may not be sufficient, making it difficult to stably fix the adsorbed sulfur-containing organic compound on the surface of the metal oxide. On the other hand, when the heat treatment temperature is greater than about 250° C., the adsorbed sulfur-containing organic compound may be thermally degraded, making it difficult to stably fix the same on the surface of the metal oxide.

Also, in order to more stably fix the sulfur-containing organic compound on the surface of the metal oxide, the metal oxide antioxidant having the sulfur-containing organic compound adsorbed thereon, obtained through pulverization, may be heat-treated for about 20 min to 15 hr, or about 2 hr to 6 hr. When the heat treatment time is less than about 20 min, the heat treatment effect may not be sufficient, making it difficult to stably fix the adsorbed sulfur-containing organic compound on the surface of the metal oxide. On the other hand, when if the heat treatment time is greater than about 15 hr, the adsorbed sulfur-containing organic compound may be thermally degraded, making it difficult to stably fix the same on the surface of the metal oxide, and furthermore, productivity may decrease due to the long processing time.

The electrolyte membrane 30 may be manufactured using the antioxidant thus obtained. The method thereof is not particularly limited, and the antioxidant may be applied in various forms, such as a solid powder or a suspension. For example, the antioxidant may be added to the ionomer dispersion and uniformly dispersed therein, and the resulting solution may be applied on a substrate and dried, thereby manufacturing an electrolyte membrane.

In order to maximize an increase in the chemical durability of the electrolyte membrane by adding the antioxidant of the present invention thereto, the amount of the antioxidant that is added into the dried solid electrolyte membrane has to be about 0.05 to 4 wt %, or about 0.2 to 1 wt % based on the total weight of the electrolyte membrane. When the amount of the antioxidant is less than about 0.05 wt %, the effect of increasing the chemical durability of the electrolyte membrane may not be sufficient. On the other hand, when the amount thereof is greater than about 4 wt %, the proton conductivity of the electrolyte membrane may greatly decrease, and efficient bonding may become difficult upon manufacturing the membrane-electrode assembly by assembling the electrode to the electrolyte membrane.

EXAMPLE

A better understanding of the present invention will be given through the following examples, which are merely set forth to illustrate the present invention but are not to be construed as limiting the scope of the present invention.

Antioxidant Preparation Example 1

As a metal oxide, cerium oxide (CAS Number: 1306-38-3) was used. The crystallite size of cerium oxide was measured to be about 25 nm through X-ray diffraction.

As a sulfur-containing organic compound, formamidine sulfinic acid (CAS Number: 1758-73-2, Sigma Aldrich) was used.

Cerium oxide and formamidine sulfinic acid were mixed and subjected to bead milling at about 300 rpm, whereby formamidine sulfinic acid was adsorbed on the surface of cerium oxide. The mass ratio of cerium oxide to formamidine sulfinic acid was adjusted to 10:1. Fran The average particle diameter of the pulverized antioxidant agglomerate was about 80 nm.

Finally, heat treatment was performed at a temperature of about 80° C. for 3 hr, thus completing stable adsorption between the cerium oxide and the formamidine sulfinic acid, ultimately obtaining an antioxidant.

Antioxidant Preparation Example 2

An antioxidant was prepared in the same manner as in Preparation Example 1, with the exception that the mass ratio of cerium oxide to formamidine sulfinic acid was adjusted to 10:2.

Examples 1 and 2

The antioxidant of each of Preparation Examples 1 and 2 was added to a perfluorinated-sulfonic-acid-based ionomer dispersion (Nafion® D2021, DuPont, USA) and dispersed therein, after which the resulting ionomer dispersion was applied on a substrate such as a film and dried, thus manufacturing the electrolyte membrane of each of Examples 1 and 2. Here, the amount of the antioxidant that was added into the dried solid electrolyte membrane was fixed to 0.8 wt %.

Comparative Example 1

A perfluorinated-sulfonic-acid-based ionomer dispersion (Nafion® D2021, DuPont, USA) not added with an antioxidant was applied on a substrate such as a film and dried, thus manufacturing an electrolyte membrane. The method and conditions for manufacturing the electrolyte membrane were the same as in Examples 1 and 2, and the amount of the antioxidant that was added into the dried solid electrolyte membrane was fixed to 0 wt %.

Comparative Example 2

An antioxidant including cerium oxide alone at a mass ratio of cerium oxide and formamidine sulfinic acid of 10:0, that is, without formamidine sulfinic acid, which is a sulfur-containing organic compound, was added to a perfluorinated-sulfonic-acid-based ionomer dispersion (Nafion® D2021, DuPont, USA) and dispersed therein. The method and conditions for manufacturing the electrolyte membrane were the same as in Examples 1 and 2, and the amount of the antioxidant that was added into the dried solid electrolyte membrane was fixed to 0.8 wt %.

Comparative Example 3

An antioxidant including formamidine sulfinic acid alone at a mass ratio of cerium oxide and formamidine sulfinic acid, as a sulfur-containing organic compound, of 0:10, that is, without cerium oxide, was added to a perfluorinated-sulfonic-acid-based ionomer dispersion (Nafion® D2021, DuPont, USA) and dispersed therein. The method and conditions for manufacturing the electrolyte membrane were the same as in Examples 1 and 2, and the amount of the antioxidant that was added into the dried solid electrolyte membrane was fixed to 0.8 wt %.

The composition of the antioxidant of each of Examples and Comparative Examples and the antioxidant content in the electrolyte membrane are summarized in Table 1 below.

TABLE 1

| Items | Example 1 | Example 2 | Comparative Example 1 | Comparative Example 2 | Comparative Example 3 |
|---|---|---|---|---|---|
| Mass ratio of cerium oxide: formamidine sulfinic acid in antioxidant | 10:1 | 10:2 | 0:0 | 10:0 | 0:10 |
| Antioxidant content (wt %) in electrolyte membrane | 0.8 | 0.8 | 0.0 | 0.8 | 0.8 |

Test Example 1—Visual Evaluation of Antioxidant

Figure 5A:
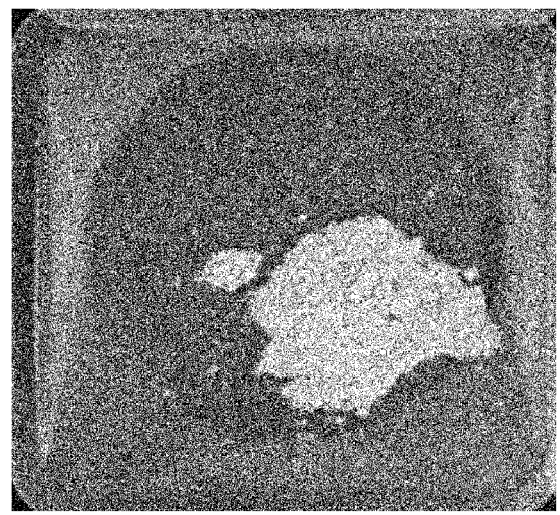
FIGS. 5A, 5B and 5C are photographs of Example 1, Example 2 and Comparative Example 2, respectively.
Figure 5B:
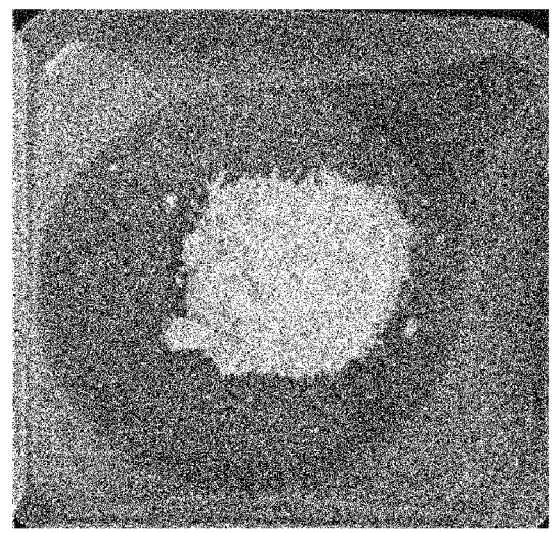
Figure 5C:
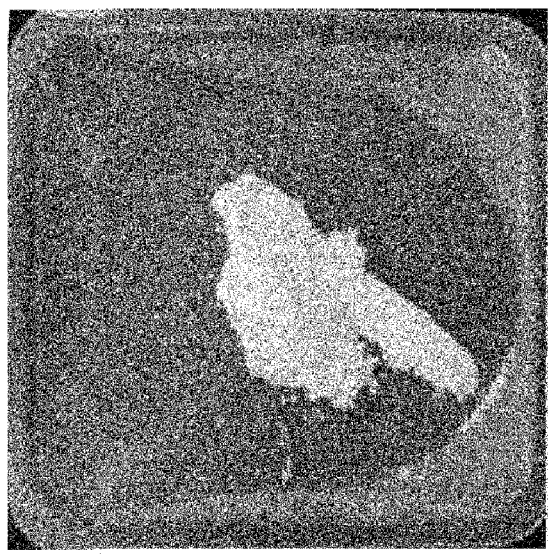

FIGS. 5A, 5B and 5C are photographs showing the antioxidants at mass ratios of cerium oxide: formamidine sulfinic acid of 10:1 (Example 1), 10:2 (Example 2) and 10:0 (Comparative Example 2), respectively. The antioxidant of Comparative Example 2, on which formamidine sulfinic acid was not adsorbed, showed a light yellow color on the surface. However, as the amount of formamidine sulfinic acid on the surface of the antioxidant increased, the surface color of the antioxidant turned from yellow to pale brown, as shown in Example 1 and Example 2.

Test Example 2—Evaluation of Distributional Stability

The surface charge of the antioxidant of Example 1, including cerium oxide and formamidine sulfinic acid at a mass ratio of 10:1, was measured. The zeta potential of cerium oxide alone was −3 mV, and the zeta potential of the antioxidant of Example 1, in which formamidine sulfinic acid was adsorbed on the surface of cerium oxide, was −23.7 mV, based on which the magnitude thereof was evaluated to greatly increase. Thereby, the antioxidant obtained by adsorbing formamidine sulfinic acid on cerium oxide was greatly increased in distributional stability.

Test Example 3—Evaluation of Antioxidant Capability

In order to evaluate the antioxidant capability of the electrolyte membranes of Comparative Examples 1 to 3 and Examples 1 and 2, each electrolyte membrane was subjected to a Fenton test, and the fluoride emission rate thereof was measured. The results thereof are shown in FIG. 6.

Figure 6:
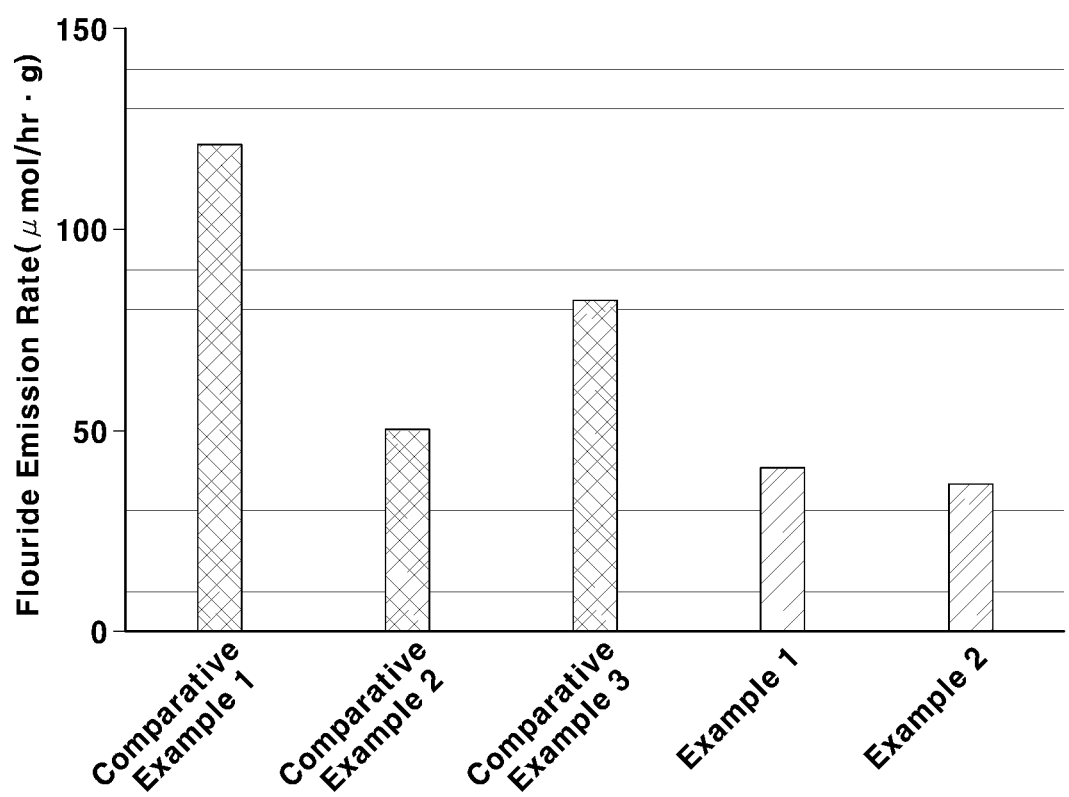
FIG. 6 shows the results of measurement of fluoride emission rate (FER) of each electrolyte membrane in order to evaluate the antioxidant capability of the electrolyte membrane of each of Examples 1 and 2 and Comparative Examples 1 to 3.

As shown in FIG. 6, the fluoride emission rate of the electrolyte membrane of Examples 1 and 2 was low compared to Comparative Examples 1 to 3, based on which the chemical durability of the electrolyte membrane was evaluated to increase. In particular, compared to Comparative Examples 2 and 3, in which either cerium oxide or formamidine sulfinic acid was used alone as the antioxidant, in Examples 1 and 2, in which both cerium oxide and formamidine sulfinic acid were used together in a manner in which formamidine sulfinic acid was adsorbed on the surface of cerium oxide, the fluoride emission rate of the electrolyte membrane was greatly decreased due to the synergistic antioxidant capability effect, and the chemical durability of the electrolyte membrane was increased.

Although various exemplary embodiments of the present invention have been described with reference to the accompanying drawings, those skilled in the art will appreciate that the present invention may be embodied in other preferred forms without changing the technical spirit or essential features thereof. Thus, the embodiments described above should be understood to be non-limiting and illustrative in every way.

What is claimed is:
1. An antioxidant for a fuel cell, comprising:
a metal oxide; and
an organic compound comprising a sulfinic acid anion group (R—$SO_2^-$) and adsorbed on the metal oxide.
2. The antioxidant of claim 1, wherein the metal oxide is represented by Chemical Formula 1 below:

$MO_{2-\delta}$   [Chemical Formula 1]

wherein M comprises one or more selected from the group consisting of a transition metal, and a rare-earth metal, and δ is an oxygen vacancy value that makes the metal oxide electrically neutral.

3. The antioxidant of claim 2, wherein M comprises one or more selected from the group consisting of zirconium (Zr), cerium (Ce), samarium (Sm), gadolinium (Gd), and terbium (Tb).

4. The antioxidant of claim 1, wherein the metal oxide is supported on a support, and
the support comprises one or more selected from the group consisting of titanium dioxide ($TiO_2$), silicon dioxide (silica, $SiO_2$), cerium oxide, cerium zirconium oxide, gadolinium-doped cerium oxide, cerium oxide supported on titanium oxide, cerium oxide supported on silicon dioxide.

5. The antioxidant of claim 1, wherein the metal oxide has a crystallite size of about 1 nm to 100 nm.

6. The antioxidant of claim 1, wherein an average particle diameter of an agglomerate of the metal oxide is about 1 nm to 900 nm.

7. The antioxidant of claim 1, wherein the organic compound comprises formamidine sulfinic acid.

8. The antioxidant of claim 1, wherein a mass ratio of the metal oxide and the organic compound is about 10:0.1 to 10.

9. A method of manufacturing the antioxidant of claim 1, comprising:
preparing a admixture comprising a metal oxide and a sulfur-containing organic compound;
pulverizing the admixture; and
heat-treating the pulverized admixture.

10. The method of claim 9, wherein the admixture is pulverized through dry milling.

11. The method of claim 9, wherein the admixture is pulverized at 50 rpm to 1,000 rpm.

12. The method of claim 9, wherein the pulverized admixture is heat-treated at 40° C. to 250° C.

13. The method of claim 9, wherein the pulverized admixture is heat-treated for 20 min to 15 hr.

14. An electrolyte membrane comprising the antioxidant of claim 1.

15. The electrolyte membrane of claim 14, wherein the electrolyte membrane comprises the antioxidant in an amount of the antioxidant of about 0.05 wt % to 4 wt % based on the total weight of the electrolyte membrane.

16. A membrane-electrode assembly, comprising:
an electrolyte membrane;
a cathode disposed on one side of the electrolyte membrane; and
an anode disposed on a remaining side of the electrolyte membrane,
wherein at least one of the electrolyte membrane, the cathode, or the anode comprises an antioxidant of claim 1.

* * * * *